United States Patent

Tanaka et al.

[11] Patent Number: 5,968,146
[45] Date of Patent: Oct. 19, 1999

[54] DATA TRANSFER DEVICE FOR DECREASING LOAD OF CPU BY AVOIDING DIRECT CONTROL FROM THE CPU IN PARALLEL COMPUTER SYSTEM

[75] Inventors: Youichi Tanaka, Koza-gun; Noboru Yamamoto, Hadano, both of Japan

[73] Assignee: Hitachi, Ltd., Tokyo, Japan

[21] Appl. No.: 08/864,692

[22] Filed: May 28, 1997

[30]    Foreign Application Priority Data

May 28, 1996  [JP]  Japan .................................... 8-132464

[51] Int. Cl.[6] .................................................. G06F 13/14
[52] U.S. Cl. ............................... 710/39; 710/52; 710/17; 710/6; 711/165
[58] Field of Search ............................ 364/200; 395/275, 395/425, 859, 872; 710/39, 52, 6, 17; 711/165

[56]          References Cited

U.S. PATENT DOCUMENTS

| | | | |
|---|---|---|---|
| 4,901,232 | 2/1990 | Harrington et al. | 364/200 |
| 5,170,471 | 12/1992 | Bonevento et al. | 395/275 |
| 5,235,687 | 8/1993 | Bacot et al. | 395/425 |
| 5,784,649 | 7/1998 | Begur et al. | 395/872 |

*Primary Examiner*—Meng-Ai T. An
*Assistant Examiner*—Harold Kim

*Attorney, Agent, or Firm*—Antonelli, Terry, Stout & Kraus, LLP

[57]              ABSTRACT

A data transfer controller connected between a device and a memory for controlling data transfer between the device and memory on the basis of a command received from a CPU. The controller includes command buffers for storing at least one data transfer command received from the CPU, an input port for reading the data transfer command from the command buffers and reading out a command packet corresponding to the data transfer command from a location within the memory instructed by the data transfer command, a packet store buffer connected to the input port for holding therein data packets and command packet read out from the memory, and a command execution circuit connected to the command buffers and the packet sore buffer for performing transfer of the data packets between the memory and device through the packet store buffer on the basis of a transfer execution flag received from the CPU. At least one data transfer command has a write command for transferring data from the memory to the device, and a read command for transferring data from the device to the memory, and the command execution circuit sends the data packets sent from the device to the packet store buffer on the basis of the data transfer command, according to a designation of the read command. When the data packet designated to be sent from the device to the packet store buffer according to the data transfer command is not held yet in the packet store buffer, the read command may not be executed. Two computer systems can be interconnected by means of respective data transfer devices to a parallel computer system as a whole.

22 Claims, 5 Drawing Sheets

DATA TRANSFER DEVICE FOR DECREASING LOAD OF CPU BY AVOIDING DIRECT CONTROL FROM THE CPU IN PARALLEL COMPUTER SYSTEM

CROSS-REFERENCES TO RELATED APPLICATIONS

This application relates to U.S. Pat. No. 5,671,371 entitled BUS CONTROL SYSTEM filed Oct. 18, 1995 which is a continuation of an application Ser. No. 08/016,692 filed Feb. 11, 1993 by N. Kondoh et al. which is now abandoned.

BACKGROUND OF THE INVENTION

The present invention relates to a data transfer device and a parallel computer system and more particularly, to a data transfer technique which can be effectively applied to data transfer between a memory and an I/O device in a computer system including workstations or servers or to interconnection between a plurality of such computer systems.

For example, a computer system including workstations or servers employs mainly reduced instruction set computer (RISC) processors. With improvement of such logical system as pipeline control and an operational frequency increased by advancement of semiconductor techniques, the single RISC processor has been increasingly improved.

Requirements demanded for such a system are first to increase the number of transactions processable per unit time especially for each server, and second not only to improve the performance of each CPU but also to provide a mechanism for allowing each CPU to be able to perform parallel processing operation in a plurality of computer systems and to increase the number of external memories such as disk units connectable thereto and the memory capacity thereof.

However, the numbers of CPUs, memories and I/O devices connectable to an identical bus or crossbar switch has its limit by electrical restrictions to load capacitances by which the data transfer operational speed of the bus or crossbar switch is guaranteed or by physical restrictions of manufacturing techniques for the size of a backboard forming the bus or crossbar switch.

For this reason, the hardware of a high-performance server requiring a multiplicity of I/O devices to be connected thereto has, in many cases, such a configuration that a system bus or crossbar switch for connecting a CPU and a memory is connected to I/O buses for connection of I/O devices in a hierarchically-connected relation, i.e., in a multi-layer bus connection relation. For the purpose of enhancing parallel processing capability, a plurality of computer systems each having CPUs are interconnected with each other via the I/O devices.

In order to secure a constant reliability in an overall system even when the number of I/O devices to be connected is increased, it is required that occurrence of a fault in one of the I/O devices cause the influence of the fault not to be transmitted to other CPUs, that is, to be localized.

Further, to nest buses means to make long a logical and physical distance between CPUs or memories and I/O devices. For this reason, when control of the I/O device is carried out directly from the CPU based on CPU instruction operation, there occurs such a problem that its instruction execution time becomes long and the performance of the CPU is degraded by the control of the I/O device. This also causes a data transfer latency between the memory and I/O device to become large. Thus, when data transfer is started directly from the I/O device, prefetch data from the memory or write data to the memory are required to be temporarily saved, which disadvantageously results in that the I/O device must have a large capacity of buffer, thus increasing costs for the I/O device.

Meanwhile, various sorts of devices have been developed in these years. However, sequential development of I/O devices compatible with their own computer systems is costly. Therefore, this requires the I/O devices manufactured by a third party to be built in own computer systems. Further, I/O devices manufactured by third party are generally compatible with industrial standard-based buses such as protocol control information (PCI) buses, and it is important to connect such an industrial standard-based bus as a PCI bus in own computer system, while minimizing the influence of the own computer system on its operating system.

Furthermore, communication of the own computer system with another computer system via the I/O device in order to allow the respective CPUs within the plurality of computer systems to perform parallel operation causes generation of an overhead with low efficiency, because of intervention of the control protocol of the I/O device during the communication between the computer systems. In addition, an upper limit of the data transfer rate is limited to the transfer rate of the I/O device per se.

SUMMARY OF THE INVENTION

It is therefore an object of the present invention to provide a data transfer technique by which control of an I/O device based directly on CPU instruction operation can be avoided, so that, even when a fault occurs in the I/O device, this fault will not be caused to transmit to a failure in CPU instruction execution and thus the influence of the fault can be minimized.

Another object of the present invention is to provide a data transfer technique which can realize efficient data transfer between an I/O device and a memory while eliminating the need for provision of special hardware such as large-capacity buffer to the I/O device.

A further object of the present invention is to provide a data transfer technique which can lessen the influence of modification in a driver program for various I/O devices on an operating system of a computer system.

Yet another object of the present invention is to provide a parallel computer system which can realize high-speed inter-system communication between memories of a plurality of computer systems while eliminating the need for intervention of any I/O devices.

Yet a further object of the present invention is to provide a parallel computer system which includes a plurality of computer systems and in which a communication interface between a data transfer device of one of the computer systems and another computer system as well as a connection interface between an I/O device and a data transfer device in one system are commonly used, thereby providing a maximum cost performance for systems ranging from small scale to large, with highly flexible hardware configuration.

In accordance with an aspect of the present invention, there is provided a data transfer controller connected between a device and a memory for controlling data transfer between the device and memory on the basis of a command received from a CPU. The data transfer controller comprises command buffers for storing at least one data transfer command received from the CPU, an input port for reading the data transfer command from the command buffers and reading out a command packet corresponding to the data transfer command from a location within the memory instructed by the data transfer command, a packet store buffer connected to the input port for holding therein data packets and command packet read out from the memory, and a command execution circuit connected to the command buffers and the packet store buffer for performing transfer of the data packets between the memory and device through the packet store buffer on the basis of a transfer execution flag received from the CPU.

In the present invention, at least one data transfer command has a write command for transferring data from the memory to the device, and the command execution circuit sends the data packets in the memory to the device according to a designation of the write command.

At least one data transfer command has a read command for transferring data from the device to the memory, and the command execution circuit sends the data packets sent from the device to the packet store buffer on the basis of the data transfer command, according to a designation of the read command.

When the data packet designated to be sent from the device to the packet store buffer according to the data transfer command is not held yet in the packet store buffer, the read command is stopped to be executed.

The external input/output ports of the data transfer controller are connected with an I/O controller for controlling a plurality of I/O devices or with another computer system. The data transfer controller controls data transfer between the memory and external input/output ports on the basis of the commands, attachment information and control information issued from the CPU by the store instruction and stored in the predetermined buffers, and outputs information about its execution result to the buffers looked up by the load instruction.

When a plurality of computer systems each having the data transfer controller are interconnected by means of the respective data transfer controllers, there can be formed a parallel computer system. In this case, a plurality of the data transfer controllers can be used as interfaces between the computer system so that combinations of the interconnected data transfer controllers are for exclusive transfer directions of the transfer data.

More specifically, the data transfer controller, for example, includes a command store buffer for storing a plurality of commands (command stream or chain) indicative of data transfer start, a memory address store buffer for storing a leading or start memory address corresponding to the command chain, a transfer byte number store buffer for storing the number of transfer bytes corresponding to the command chain, a command chain information store buffer for storing information on the command chain, a command execution instruction register for instructing, by a value set therein, decoding of the command chain stored in the command store buffer and execution start of the data transfer, a command execution completion display register for display of the data transfer completion by the command chain, a status display register for storing an execution result of the data transfer by the command chain, a command clear instruction register for instructing, by setting of control information therein, initialization of contents of the command store buffer, an output buffer for temporarily storing data transferred from the memory to the external output port, and an input buffer for temporarily storing data transferred from the external input port to the memory.

Data to be written in the aforementioned command store buffer, memory address store buffer, transfer byte number store buffer, command chain information store buffer, command execution instruction register and command clear instruction register are given by the store instruction of CPU; whereas data to be written in the aforementioned command execution completion display register and status display register are generated by the data transfer controller per se.

The types of the commands stored in the above command store buffer, as an example, include a write command for causing data transfer from the memory to the external output port, a wait-and-read command for causing waiting until data is stored in the input buffer from the external input port at the time of the data transfer from the external input port to the memory but in the absence of the data in the input buffer, and a read command for causing no execution of the data transfer at the time of the data transfer from the external input port to the memory but in the absence of data in the input buffer.

When it is desired to perform data transfer between the I/O devices connected downstream of the data transfer controller of the present invention, the store instruction of the CPU causes a command chain associated with desired data transfer operation to be written in the command store buffer and also causes attachment information associated with the commands to be written in the memory address store buffer, transfer byte number store buffer and command chain information store buffer. Thereafter, the store instruction of the CPU causes a command execution start flag to be written in the command execution instruction register. The data transfer controller, in response to the fact that the command execution start flag was written in the command execution instruction register, reads out the commands and attachment information associated therewith from the command store buffer, memory address store buffer, transfer byte number store buffer and command chain information store buffer, decodes the commands, and starts the data transfer. When completing the command execution, the data transfer controller, on the basis of the judgement of the command chain information, further reads the next command for execution, or stores the command execution result in the status display register and stores a flag indicative of completion of the command execution in the command execution completion display register.

The CPU, after instructing the command execution start, reads the contents of the command execution completion display register and status display register with use of the load instruction to know the execution completion and execution result of the instructed command chain.

With respect to the I/O controllers connected downstream of the external input/output ports of the data transfer controller or connected to another computer system, the driver program of the operating system controls and executes the data transfer between the memory of its own system and the I/O controllers or another computer system by combining the commands.

In the present invention, as has been explained above, when the data transfer is carried out from the CPU to the data transfer controller, only the store instruction is used. Since the CPU completes the operation of the store instruction at the time of having issued it therefrom, when such a system as to start the data transfer based on the control information issued from the CPU by the store instruction is used as in the present invention, data transfer control will not cause deterioration of the performance of the CPU.

Though devices connected downstream of the external input/output ports of the data transfer controller include the I/O controller or another computer system, differences in the data transfer specifications thereof can be accommodated by the driver program of the operating system. Accordingly, since the hardware of the data transfer controller can be used commonly even in the connection of both the I/O controller and computer, the computer system incorporating the data transfer controllers based on the data transfer technique of the present invention can be flexibly set in its system configuration while securing its cost performance.

DESCRIPTION OF THE PREFERRED EMBODIMENTS

An embodiment of the present invention will be detailed with reference to the attached drawings.

Figure 1:
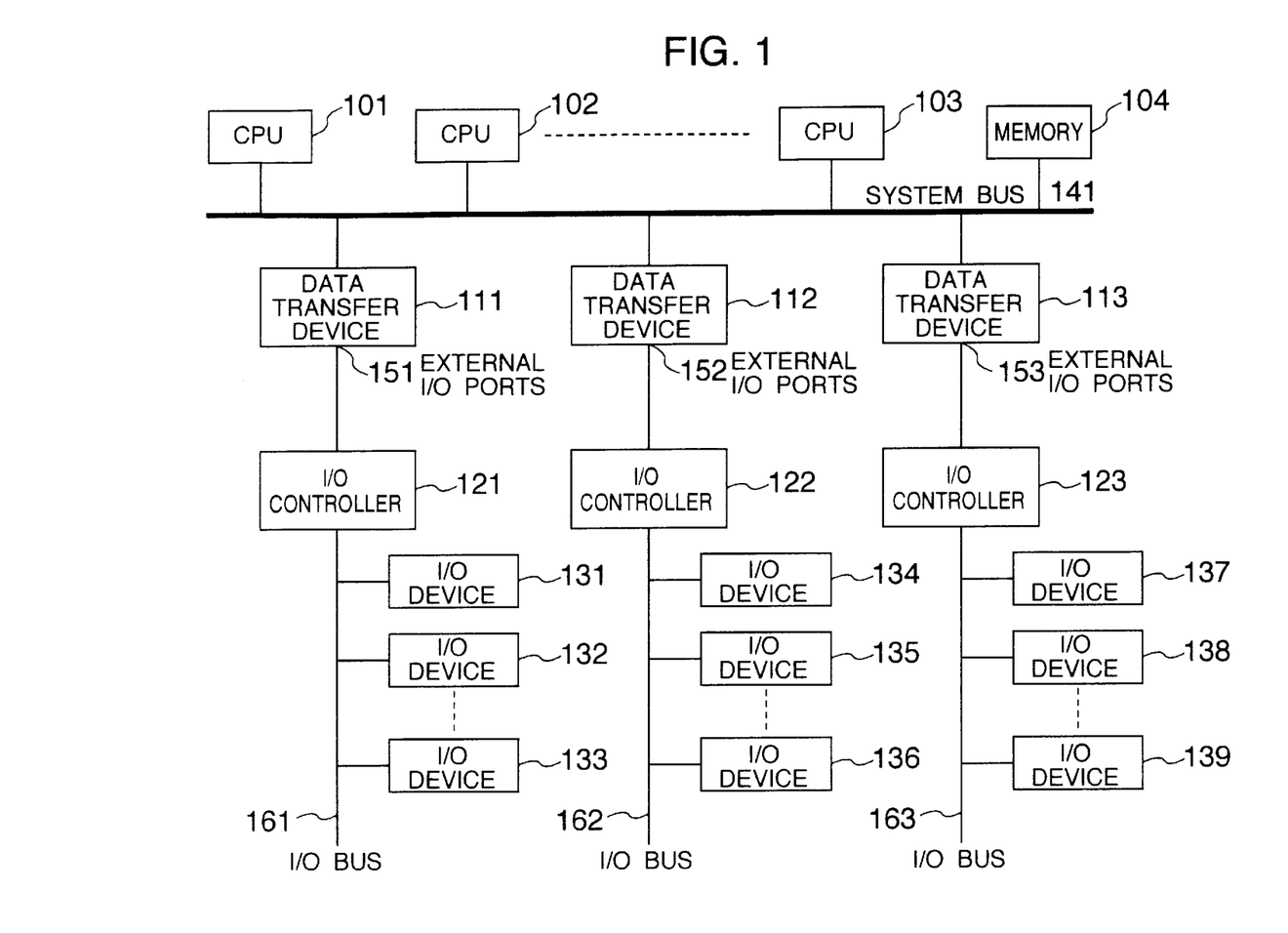
FIG. 1 is a block diagram of an exemplary arrangement of a computer system comprising a plurality of data transfer devices in accordance with an embodiment of the present invention.

Referring first to FIG. 1, there is shown a block diagram of an exemplary arrangement of a computer system which comprises data transfer devices in accordance with an embodiment of the present invention.

In the computer system of the present embodiment of a multi-processor type; a plurality of CPUs 101 to 103, a memory 104 and data transfer devices 111 to 113 are connected to a system bus 141. The data transfer devices 111 to 113 have respective external I/O ports 151 to 153 which in turn are connected through I/O buses 161 to 163 to I/O controllers 121 to 123 for control of a plurality of I/O devices 131 to 139. Data transfer between the memory 104 and I/O controllers 121 to 123 is carried out through the respective data transfer devices 111 to 113. More specifically, a command stream for causing the data transfer is written based on the instruction operation of the data transfer devices 111 to 113 in the data transfer devices 111 to 113, which in turn decode the command stream and executes the data transfer.

When a fault occurred in the I/O devices 131 to 139 or I/O controllers 121 to 123 of the computer system comprising the data transfer device of the present embodiment, this fault merely results in abnormal completion of data transfer and is distinguished from a fault in the CPUs 101 to 103 including an instruction execution fault. In other words, the fault range can be localized. Accordingly, even in the case of a large-scale computer system having a multiplicity of I/O devices 131 to 139 connected therein, when the computer system employs the arrangement of the present embodiment, even an increase in the number of faults in the I/O devices 131 to 139 caused by an increase in the number of I/O devices 131 to 139 connected enables the prevention of corresponding reduction in the reliability of the CPUs 101 to 103.

Even when a new I/O device, in particular, an I/O device manufactured by a third party is connected to the computer system of the present embodiment, differences in control specifications unique to the new I/O device can be accommodated by a circuit function attached to the I/O device, thus avoiding the influence thereof on the data transfer system between the memory 104 and I/O controllers 121 to 123. Thus, the need for changing the operating system of the computer system in question can be eliminated.

The performance of the CPUs 101 to 103 is influenced by the operational speed of the hardware for performing instruction operation over the CPUs. In the arrangement of the present embodiment, the hardware for performing instruction operation over the CPUs 101 to 103 includes the CPUs 101 to 103, memory 104, and data transfer devices 111 to 113 connected to the system bus 141, which will be explained later. Devices located downstream of the external I/O ports 151 to 153 of the data transfer devices 111 to 113 will not affect the instruction operation of the CPUs 101 to 103. Therefore, with the arrangement of the present embodiment, by increasing the operational speeds of the CPUs 101 to 103, memory 104 and data transfer devices 111 to 113 connected to the system bus 141, the performance of the CPUs 101 to 103 can also be improved. In the present embodiment, since interconnection between the data transfer devices 111 to 113 for direct data transfer not directly associated with the CPU performance and the I/O controllers 121 to 123 is carried out by means of cable or the like, when the data transfer devices 111 to 113 or the like connected to the system bus 141 are mounted at a high mounting density in a hardware manner, improvement in the performance of the CPUs 101 to 103 can be indirectly realized based on the increase of the operational speed of the data transfer devices 111 to 113.

Figure 2:
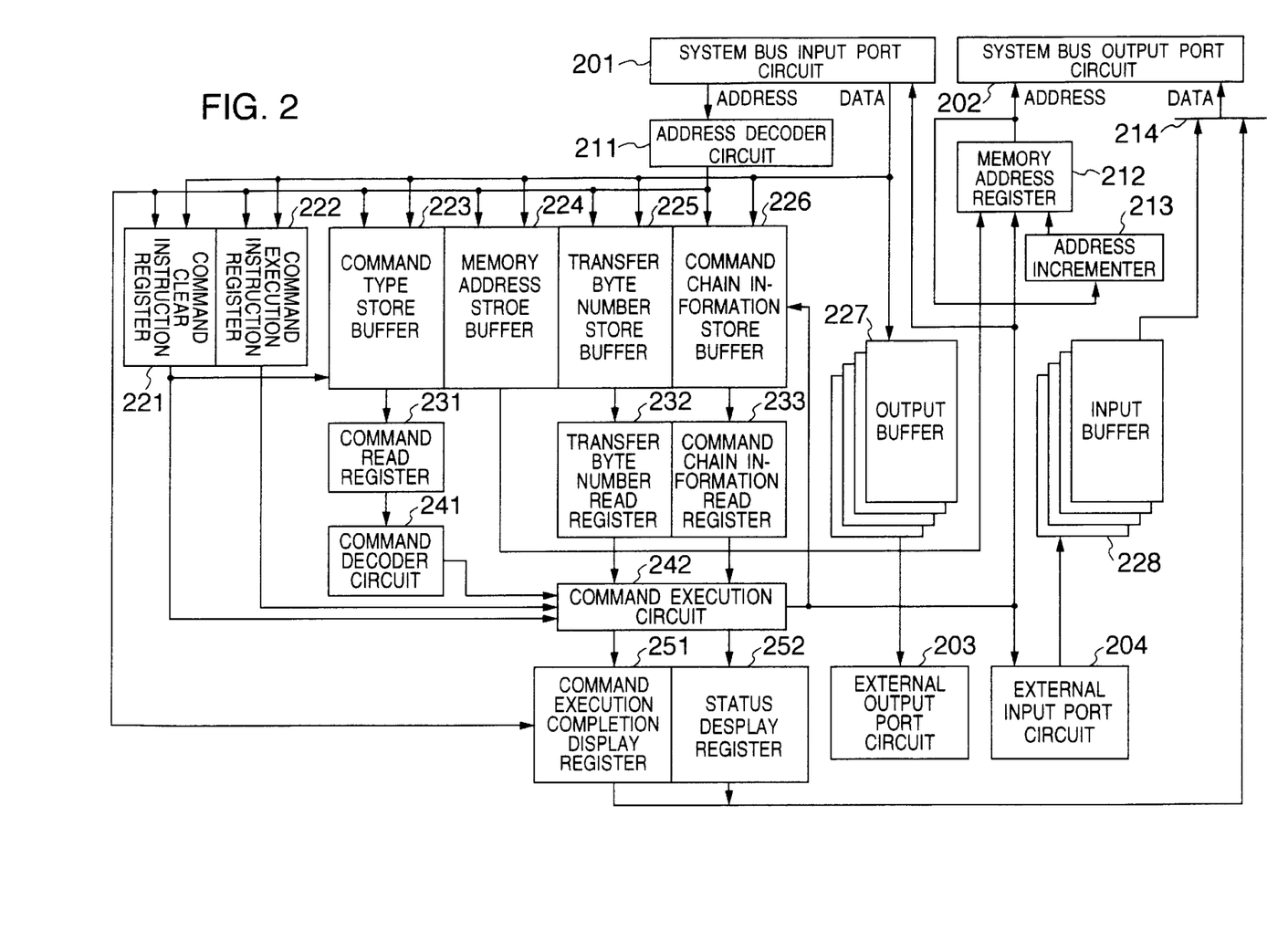
FIG. 2 is a block diagram of an exemplary arrangement of one of the data transfer devices used in the embodiment of the present invention.
Figure 3A:
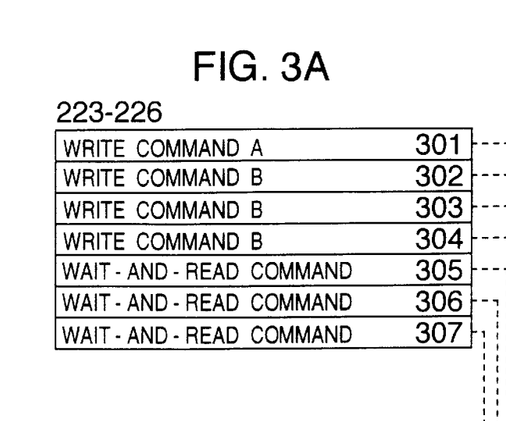
FIGS. 3A and 3B show diagrams for explaining exemplary control flow of data transfer between the data transfer device and an I/O controller in the computer system of FIG. 1.
Figure 3B:
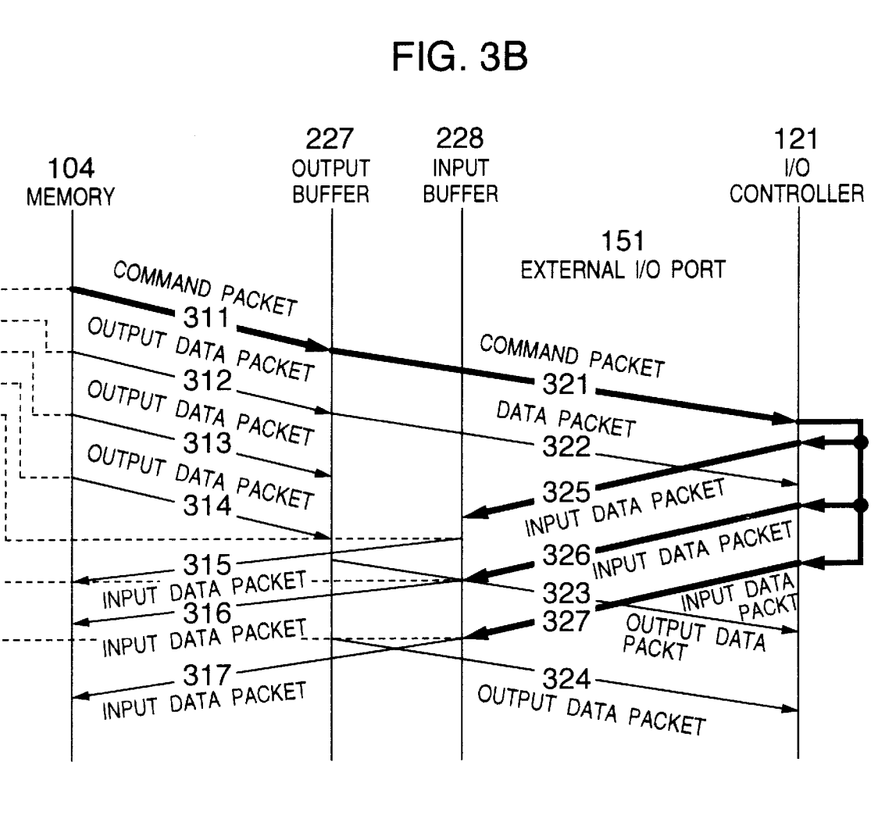

Explanation will next be made as to exemplary structure and operation of one of the data transfer devices 111 to 113 in the computer system in accordance with the embodiment of FIG. 1, by referring to FIGS. 2 and 3. More specifically, FIG. 2 is a block diagram of one of the data transfer devices 111 to 113 employing the data transfer system of the present embodiment, and FIGS. 3A and 3B show diagrams for explaining a relationship in data transfer control between a command buffer in the data transfer devices 111 to 113 and the I/O controller 121. The data transfer devices 111 to 113 have each an equivalent arrangement and the devices located downstream thereof have also an equivalent structure. Thus, explanation will be focused only on the data transfer device 111 as a representative.

As shown in FIG. 2, the data transfer device 111 has a system bus input port circuit 201 and a system bus output port circuit 202 as interfaces on the side of the system bus 141, and also has an external output port circuit 203 and an external input port circuit 204 as interfaces on the side of the external I/O port 151. Provided in data transfer paths between the system bus input/output port circuits 202, 202 and the external output/input port circuits 203, 204 are an output buffer 227 and an input buffer 228.

Connected to the system bus input port circuit 201 are an address decoder circuit 211, a command clear instruction register 221, a command execution instruction register 222, a command store buffer 223, a memory address store buffer 224, a transfer byte number store buffer 225 and a command chain information store buffer 226.

The command clear instruction register 221 and command execution instruction register 222 are referred to or looked up by a command execution circuit 242. The command store buffer 223 is looked up by the command execution circuit 242 through a command read register 231 and a command decoder circuit 241. The transfer byte number store buffer 225 is looked up by the command execution circuit 242 through a transfer byte number read register 232. The command chain information store buffer 226 is looked up by the command execution circuit 242 through a command chain information read register 233. A value set in the memory address store buffer 224 is used to generate an address input of the system bus output port circuit 202 through a memory address register 212 and an address incrementer 213.

The command execution circuit 242 outputs flag information indicative of presence or absence of execution completion of a command to a command execution completion display register 251, and also outputs information on the command execution result to a status display register 252. The information of the command execution completion display register 251 and status display register 252 becomes data input to the system bus output port circuit 202 via a selector 214 to be referred to by the CPUs 101 to 103. The selector 214 functions to select connections between the input buffer 228 and the command execution completion display register 251 and status display register 252, both to the system bus output port circuit 202.

It is assumed in the present embodiment that not only the data transfer from the memory 104 to the I/O controller 121 but also the approval of data transfer from the I/O controllers 121 to 123 to the memory 104 in the opposite direction thereto is controlled by a driver program of the operating system of the computer system in question. The unit of data transferred between the memory and I/O controller is called data packet. The unit of commands for instructing the data transfer to the I/O controller is called command packet. Commands for reading the command and data packets prepared in the memory are called write commands (A) and (B) respectively. A command for inputting the data packet into the memory from an external location is called a wait-and-read command.

Explanation will now be made in connection with a case where 3 data packets 312 to 314 to be transferred from the memory 104 to the I/O controller 121 are present on the memory 104 and at the same time, transfer of 3 data packets 325 to 327 from the I/O controller 121 to the memory 104 is approved. The I/O device sends, to the I/O controller 121, the transfer data to be transferred to the memory in a well known manner.

A CPU first generates on the memory 104 a command packet 311 and 3 output data packets 312 to 314 indicative of representation of the above 6 transfer data pieces between the memory and I/O device, the CPU next sets predetermined data in the command clear instruction register 221 of the data transfer device 111 with use of a store instruction to initialize the store buffers 223 to 226, and writes in the command store buffers 223 to 226 a write command (A) 301 to write a command packet 311 from the memory in the output buffer 227, write commands (B) 302 to 304 to write 3 data packets on the memory in the output buffer 227, and 3 wait-and-read commands 305 to 307 to input data, with use of 7 store instructions. In the bus operation of the system bus 141 on which such store or load instructions appear, the address decoder circuit 211 decodes an address in the instruction operand, whereby the I/O controllers 121 to 123 knows the objective register or buffer. If it is impossible with use of one of the aforementioned store instructions to send and store one command packet in the command chain information store buffer 226, then the CPU can issue a store instruction to store a command type in the command store buffer 223, a store instruction to store a memory address of the transfer data in the memory address store buffer 224, and a store instruction to store a transfer byte number in the transfer byte number store buffer 225. When a command packet is followed by the command packets stored in the command store buffers 223 to 226, the CPU issues a store instruction to write a flag indicative of presence of a command chain in the command chain information store buffer 226. The CPU issues a store instruction to write a flag indicative of absence of a command chain at a location corresponding to the last command (the wait-and-read command 307 in this case) in the command chain information store buffer 226. Through the aforementioned procedure, such a command chain as shown in FIG. 3A is stored in the command store buffers 223 to 226. The CPU finally writes a command execution instruction flag in the command execution instruction register 222 with use of a store instruction, thereby starting execution of such a series of transfer operations as shown in FIG. 3B.

When the command execution instruction flag (first control information) is written in the command execution instruction register 222, data are read out from the command type store buffer 223, memory address store buffer 224, transfer byte number store buffer 225, and command chain information store buffer 226, and then are set in the command read register 231, memory address register 212, transfer byte number read register 232 and command chain information read register 233, respectively. Thereafter, the read-out command type is decoded by the command decoder circuit 241 and control is passed to the command execution circuit 242. In the present embodiment, the first command is the write command 301 with which the transfer of the command packet 311 to the output buffer 227 starts. On the system bus 141, the data is transferred on a basis of transfer unit determined by the protocol of the system bus 141, and the memory address is incremented by the address incrementer 213 every time. When the command packets temporarily stored in the output buffer 227 reach the transfer unit amount of the external I/O port 151, the command packets start to be transferred to the I/O controller 121 via the external output port circuit 203. When the designated command packets are all sent from the memory 104 to the output buffer 227, the command execution circuit 242 judges that the value of the command chain information read register 233 indicates the presence of a command chain, and reads out the next command type, memory address, transfer byte number and command chain information. The above operations are repeated in the subsequent procedure.

When receiving a command packet 321 (indicative of approval of sending of 3 data packets to the I/O controller 121) from the external output port circuit 203, the I/O controller 121 sends the data packets 325 to 327 (data packets from the I/O controller 121) to the input buffer 228.

The commands read out for fifth, sixth and seventh time are the wait-and-read commands which are used to transfer to the memory 104 packets which are anticipated to be sent from the I/O controller 121. The packets temporarily stored in the input buffer 228 are actually transferred to the memory 104, but when the command decoding timing is faster than the send timing of the data packets from the I/O controller 121, the wait-and-read command waits for completion of storage of the data packets in the input buffer 228. After transfer completion of the transfer data 317 to the memory in response to the seventh wait-and-read command 307, the value of the command chain information read register 233 indicates the chain-absence flag. Thus, the data transfer device 111 performs no command reading operation, sets a flag (second control information) indicative of completion of execution of the command chain in the command execution completion display register 251, and stores its execution result (third control information) in the status display register 252.

The driver program of the operating system of the CPU in question and a CPU, when reading out the command execution completion display register 251 and status display register 252 with use of the load instruction, can know the execution completion of the command chain and its execution result.

Even when the packet transmission from the I/O controllers 121 to 123 is approved, the I/O controller 121 may not always send the packets. In order to avoid such a defect that the wait-and-read command endlessly waits for the packets, a read command can be used to activate the data transfer. Since the read command terminates its command operation in the absence of a packet to be transferred to the memory 104 in the input buffer 228, the next command can be quickly executed.

In the present embodiment, as has been explained above, by incorporating the data transfer devices in the computer system, an influence range of hardware affecting the CPU instruction operational performance can be localized up to the data transfer device, even during the transfer control of data to the I/O device connected to the data transfer device, with the result that high-density mounting of the data transfer device area enables increase of the CPU instruction operational speed. Further, since the CPU cannot access up to the data transfer device with use of the load/store instructions, there can be eliminated a danger that an I/O fault in the devices located downstream of the I/O controller 121 is transmitted to the CPU, and therefore the overall computer system can be improved in reliability.

Embodiment 2

Explanation will next be made as to an application example in which the data transfer technique of the present invention is applied to a parallel computer system having a plurality of computer systems connected therein, by referring to FIGS. 4 and 5.

Figure 4:
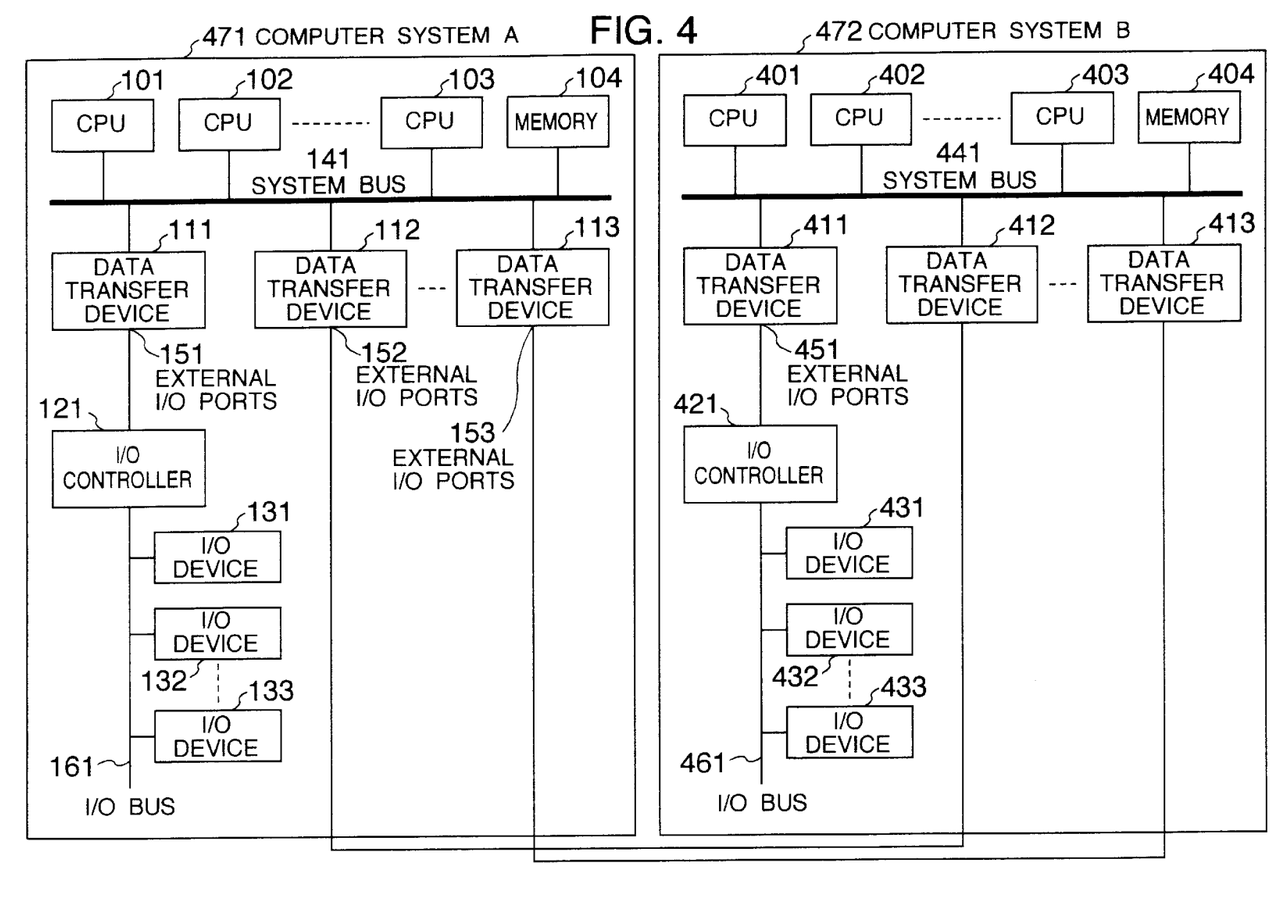
FIG. 4 is a block diagram of an exemplary arrangement of a parallel computer system including a plurality of computer systems having the data transfer devices employing a data transfer technique of the present invention, which are mutually interconnected to perform data transfer.

Shown in FIG. 4 is a block diagram of an exemplary arrangement of a parallel computer system in which a plurality of computer systems are mutually interconnected through the data transfer devices employing the data transfer technique of the present invention for data transfer.

A computer system A (471) and a computer system B (472) are interconnected by means of a data transfer device 112 and a data transfer device 412 as well as a data transfer device 113 and a data transfer device 413, so that data on the memory 104 of the system A and data on a memory 404 of the system B are mutually transferred through these data transfer devices. Since the present embodiment is based on such data transfer control specifications that data is transferred from each computer system on an asynchronous basis, to which end each computer system has an exclusive data transfer device for transmission of data packets and for reception of the status display packet and a data transfer device for exclusive reception of data packets.

It is assumed in the computer system A (471) that the data transfer device 112 is used to exclusively transmit data packets and receive the status display packet and the data transfer device 113 is used to exclusively receive data packets; and similarly it is assumed in the computer system B (472) that the data transfer device 413 is used to exclusively transmit data packets and receive the status display packet and the data transfer device 412 is used to exclusively receive data packets.

Figure 5:
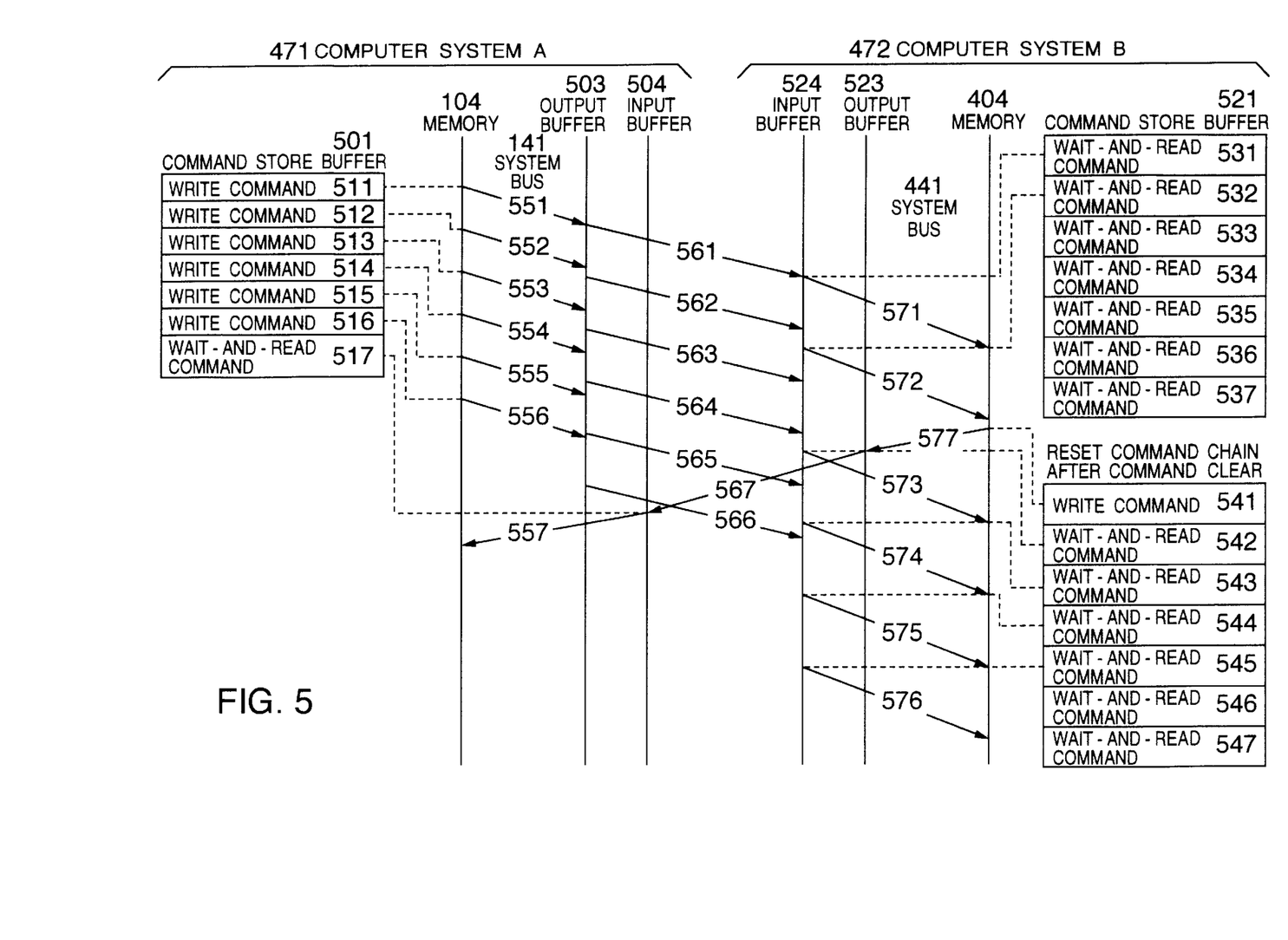
FIG. 5 is a diagram for explaining an exemplary control flow of data transfer between the data transfer devices in the parallel computer system of FIG. 4.

Explanation will then be made as to an exemplary control flow of transferring operation of data packets from the computer system A (471) to the computer system B (472), with reference to FIG. 5. More specifically, FIG. 5 shows the transfer control of packets from the data transfer device 112 of the computer system A (471) to the data transfer device 412 of the computer system B (472).

Assume now that, as an example, packets to be transferred from the memory 104 of the computer system A (471) to the memory 404 of the computer system B (472) include a command packet requiring sending of a status display packet and 5 data packets.

In the computer system A (471), for the purpose of transmitting the command packet requiring sending of the status display packet and the 5 data packets, write commands 511 to 516 are set in a command store buffer 501 of the data transfer device 112, and required values necessary are also set in the transfer byte number store buffer and command chain information store buffer. For the purpose of transferring to the memory 104 the status display packet which is expected to receive, further, a wait-and-read command 517 is set in the command store buffer 501, and required values are also set in the transfer byte number store buffer and command chain information store buffer. In this connection, it is necessary that command chain information at least to the wait-and-read command 517 not be a command chain.

In the computer system B (472), on the other hand, for the purpose of transferring to the memory 404 packets to be received, wait-and-read commands 531 to 537 are set in a command store buffer 521 of the data transfer device 412, and required values are also set in the memory address store buffer, transfer byte number store buffer and command chain information store buffer. It is assumed in the present embodiment that the driver program of the operating system is based on such specifications as to examine the contents of packets to be transferred to the memory 404 on every two-packet basis. To this end, the command chain information is set to have no command chain at intervals of one packet so that the driver program of the operating system can see the transfer completion of every 2 packets to the memory 404. When the packet transfer starts under the above settings, the computer system A (471) continuously sends the command packet requiring the sending of the status display packet and the 5 data packets. The computer system B (472) receives these packets in the input buffer of the data transfer device 412, but after completing the transferring operation of the command packet requiring the sending the status display packet and one of the data packets to the memory 404, stops the transferring operation to the memory 404 to set the command chain information to have no command chain. The driver program of the operating system, by inspecting the command execution completion register and status display register of the data transfer device 412, detects that 2 packets are already transferred to the memory 404, and then examines the contents of these packets. As a result, for the purpose of detecting reception of the command packet requiring the sending of the status display packet and transmitting the status display packet in response thereto, the command store buffer 521 of the data transfer device 412 is once set in the command clear instruction register for its initialization. Thereafter, in order to generate the status display packet on the memory 404 and send it to the computer system A (471), a write command 541 is set in the command store buffer 521 of the data transfer device 412, and required values are also set even in the memory address store buffer, transfer byte number store buffer and command chain information store buffer. Subsequently, wait-and-read commands 542 to 547 are set and required values are also even in the memory address store buffer, transfer byte number store buffer and command chain information store buffer. After this, a command execution flag is written in the command execution instruction register of the data transfer device 412 to resume the data transfer between the memory 404 and data transfer device 412.

In this way, in the parallel computer system of the present embodiment, since a plurality of computer systems are interconnected by means of the respective I/O controllers and the data transfer devices equivalently connectable with other computer systems, the data transfer devices can be used to connect the I/O controllers and computer systems in general-purpose applications and thus there can be realized various sorts of flexible systems which range from small-scale to large-scale and have optimum cost performance.

Since interconnection of a plurality of computer systems requires no intervention of I/O controllers and I/O devices, further, it can be avoided that the data transmission rate between the plurality of computer systems is restricted by the performances of the I/O controllers or I/O devices, whereby the parallel computer system can be improved in performance.

In each computer system, furthermore, since the control range of data transfer to another computer system is restricted to the interior of the data transfer device of the computer system in question, a fault generated in one computer system can be prevented from being transmitted to another computer system and thus the overall parallel computer system can be enhanced in operational reliability.

Although the present invention has been detailed in connection with the embodiments, it should be appreciated that the intention is not to limit the invention only to these embodiments shown but rather to include all alterations, modifications and equivalent arrangements possible within the scope of appended claims.

What is claimed is:

1. A data transfer controller connected between an input/output (I/O) device and a memory for controlling data transfer between the I/O device and the memory on the basis of a command received from a processor, comprising:

an input port connected to said memory via a system bus, for receiving a data transfer command from said processor and reading out a data packet corresponding to said data transfer command from a location within said memory designated by said data transfer command;

command buffers connected to said input port, for storing at least one data transfer command received from said processor;

a packet store buffer connected to said input port, for holding therein data packets and command packets read out from said memory via said input port;

a command execution circuit connected to said command buffers and said packet store buffer, for performing transfer of the data packets between said memory and said I/O device via said packet store buffer on the basis of a transfer execution flag received from said processor; and an output port connected to said packet store buffer and said I/O device, for transferring the data packets from said packet store buffer to said I/O device under control of said command execution circuit.

2. A data transfer controller as claimed in claim 1, wherein said at least one data transfer command has a write command for transferring the data packets from said memory to said I/O device, and said command execution circuit transfers the data packets sent from said memory to said I/O device according to designation of said write command.

3. A data transfer controller as claimed in claim 2, wherein said at least one data transfer command has a read command for transferring the data packets from said I/O device to said memory, and said command execution circuit transfers the data packets sent from said I/O device to said packet store buffer according to designation of said read command.

4. A data transfer controller as claimed in claim 3, wherein, when the data packets designated to be sent from said I/O device to said packet store buffer according to designation of said read command are not yet held in said packet store buffer, said read command is stopped to be executed.

5. A data transfer controller as claimed in claim 3, wherein said read command is a wait-and-read command, when the data packets designated to be sent from said I/O device to said packet store buffer according to designation of said read command are not held in said packet store buffer, for waiting for the data packets to be held in the packet store buffer and then transmitting the data packets to said memory.

6. A data transfer controller as claimed in claim 5, wherein said I/O device is arranged along with a plurality of different I/O devices.

7. A data transfer controller as claimed in claim 5, wherein said I/O device corresponds to a second data transfer controller connected to a second memory and a second processor for controlling data transfer between said second memory and said second data transfer controller based on a command received from said second processor, said second data transfer controller comprising:

a second input port connected to said second memory via said system bus, for receiving a second data transfer command from said second processor and reading out a command packet corresponding to said second data transfer command from a location within said second memory designated by said second data transfer command;

second command buffers connected to said second input port, for storing at least one second data transfer command received from said second processor;

a second packet store buffer connected to said second input port, for holding the data and command packets read out from said second memory via said second input port; and a second command execution circuit connected to said second command buffers and said second packet store buffer, for performing transfer of data packets between said second memory and said second packet store buffer on the basis of a second transfer execution flag received from said second processor.

8. A data transfer control method for controlling data transfer between an input/output (I/O) device and a memory on the basis of a command received from a processor, comprising the steps of:

storing, in command buffers, at least one data transfer command received from the processor;

reading, from said command buffers, a command packet corresponding to said data transfer command stored in said command buffers from a location within said memory designated by said data transfer command;

holding data packets read from said memory in a packet store buffer connected to an input port; and performing transfer of the data packets from said packet store buffer to said I/O device on the basis of said command packet held in said command buffers.

9. A data transfer control method as claimed in claim 8, wherein said at least one data transfer command has a write command for transferring data from said memory to said I/O device, and the data packets from said memory are transferred to said I/O device according to designation of said write command.

10. A data transfer control method as claimed in claim 9, wherein said at least one data transfer command has a read command for transferring data from said I/O device to said memory, and the data packets sent from said I/O device are transferred to said packet store buffer according to designation of said read command.

11. A data transfer control method as claimed in claim 10, wherein, when the data packets designated to be sent from said I/O device to said packet store buffer according to designation of said read command are not yet held in said packet store buffer, said read command is stopped to be executed.

12. A data transfer control method as claimed in claim 10, wherein said read command is a wait-and-read command, when the data packets designated to be sent from said I/O device to said packet store buffer according to said data transfer command are not yet held in said packet store buffer, for waiting for the data packets to be held in the packet store buffer and then transmitting the data packets to said memory.

13. A data transfer device connected between a processor, a memory and input/output (I/O) devices, comprising:

external input and output ports connected to said I/O devices, for performing data transfer to and from said I/O devices;

system bus input and output ports connected to said processor and said memory via a system bus, for performing data transfer from and to said memory;

first buffers connected to said system bus input port, for storing a plurality of commands instructing said data transfer and attachment information associated therewith to be output by a store instruction from said processor;

a command execution circuit for reading out said commands and said attachment information from said first buffers to execute said data transfer;

second buffers for storing first control information instructing at least one of clear and execution start of said commands held in said first buffers to said command execution circuit to be output by the store instruction from said processor;

third buffers for storing second control information indicative of at least one of an execution result and execution completion of said commands output from said command execution circuit to be referred to by a load instruction from said processor;

an input buffer connected to said external input port and said system bus output port, for buffering data transfer therebetween under control of said command execution circuit; and an output buffer connected to said system input port and said external output port, for buffering data transfer therebetween under control of said command execution circuit.

14. A data transfer device as claimed in claim 13, wherein:

said attachment information includes a header memory address indicative of access start position in said memory accessed by execution of said commands, a transfer byte number and command chain information indicative of presence or absence of continuous execution of said commands;

said commands include at least a write command for performing data transfer from said memory to said external output port, a wait-and-read command for performing data transfer from said external input port to said memory but when external data fails to reach said external input port, for waiting for arrival of the external data at said external input port, and a read command for performing data transfer from said external input port to said memory but, when data fails to reach said external input port, for performing no data transfer and terminating the execution of said data transfer; and said command execution circuit sequentially executes said data transfer associated with one of said commands according to a sequence of said commands stored in said first buffer and, when completing the execution of said data transfer associated with one of said commands, executes the next command according to said command chain information associated with the related command or stores flags indicative of said execution result of the current command and execution completion of the current command in said second buffer as said second control information.

15. A parallel computer system including a plurality of computer systems each having a processor, a memory and a data transfer device mutually connected thereto, wherein said plurality of computer systems interconnected by means of said data transfer devices provided therein, and said data transfer device of each computer system comprises:

external input and output ports for data transfer between said memory and an external device;

a first buffer for storing a plurality of commands instructing said data transfer and attachment information associated with said commands to be output by a store instruction from said processor;

a command execution circuit for reading out said commands and said attachment information from said first buffer;

a second buffer for storing first control information indicative of at least one of clear and execution start of said commands held in said first buffer to said command execution circuit to be output by the store instruction from said processor;

a third buffer for storing second control information indicative of at least one of an execution result and execution completion of said commands issued from said command execution circuit to be referred to by a load instruction from said processor;

an input buffer connected to said external input port and said system bus output port, for buffering the data transfer therebetween under control of said command execution circuit; and an output buffer connected to said system input port and said external output port, for buffering the data transfer therebetween under control of said command execution circuit.

16. A data transfer device connected to an input/output (I/O) device and a memory for controlling data transfer between said I/O device and said memory, said data transfer device comprising:

an external input port connected to said I/O device, for receiving a data packet from said I/O device;

an input buffer connected to said external input port, for holding said data packet received from said I/O device via said external input port;

a system bus output port connected to said memory and said input buffer;

command buffers connected to said memory, for storing a data transfer command from a processor;

a command execution circuit connected to said command buffers, for controlling transfer of said data packet from said input buffer to said memory on a basis of a read command from said processor;

a system bus input port connected to said memory, for inputting a data packet and a write command under control of said processor, said write command being held in said command buffers;

an output buffer connected to said system bus input port, for holding said data packet received from said memory; and an external output port connected to said I/O device and said output buffer, for transferring said data packet from said output buffer to said I/O device.

17. A data transfer controller as claimed in claim 16, wherein said data transfer command is a wait-and-read command, when said data packet designated to be sent from said I/O device to said input buffer according to said data transfer command is not yet held in said input buffer, for waiting said data packet and then transmitting said data packet to said memory.

18. A data transfer device as claimed in claim 17, further comprising:

a status display register for holding a result of execution of said wait-and-read command.

19. A data transfer device as claimed in claim 16, wherein said data transfer command corresponds to a write command for transferring data from said memory to said I/O device, and said data packets from said memory is transferred to said I/O device according to designation of said write command.

20. A data transfer device as claimed in claim 16, wherein said data transfer command corresponds to a read command for transferring data from said I/O device to said memory, and said data packet sent from said I/O device is transferred to said input buffer according to designation of said read command.

21. A data transfer device as claimed in claim 19, wherein, when said data packet designated to be sent from said I/O device to said input buffer according to designation of said read command is not yet held in said input buffer, said read command is stopped to be executed.

22. A data transfer device as claimed in claim 20, wherein said read command is a wait-and-read command, when said data packet designated to be sent from said I/O device to said input buffer according to designation of said read command is not yet held in said input buffer, for waiting for said data packet to be held in said input buffer and then transmitting said data packet to said memory.

\* \* \* \* \*